(12) United States Patent
Lu et al.

(10) Patent No.: US 8,239,181 B2
(45) Date of Patent: Aug. 7, 2012

(54) INVERSION OF CSEM DATA WITH MEASUREMENT SYSTEM SIGNATURE SUPPRESSION

(75) Inventors: Xinyou Lu, Missouri City, TX (US); Charlie Jing, Houston, TX (US); Thomas A. Dickens, Houston, TX (US); Dennis E. Willen, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 549 days.

(21) Appl. No.: 12/465,932

(22) Filed: May 14, 2009

(65) Prior Publication Data
US 2010/0018719 A1    Jan. 28, 2010

Related U.S. Application Data

(60) Provisional application No. 61/083,013, filed on Jul. 23, 2008.

(51) Int. Cl.
*G06G 7/48* (2006.01)
(52) U.S. Cl. .......................................... 703/10
(58) Field of Classification Search .................. 703/10
See application file for complete search history.

(56) References Cited

U.S. PATENT DOCUMENTS

| | | | | |
|---|---|---|---|---|
| 6,628,119 | B1 | 9/2003 | Eidesmo | 324/337 |
| 2009/0083006 | A1* | 3/2009 | Mackie | 703/1 |
| 2009/0150124 | A1* | 6/2009 | Wilt et al. | 703/1 |

FOREIGN PATENT DOCUMENTS
WO    WO 03/048812    6/2003

OTHER PUBLICATIONS

Alumbaugh (2000) "Linearized and Nonlinear Parameter Variance Estimation for Two-Dimensional Electromagnetic Induction Inversion," *Inverse Problem* 16, pp. 1323-1341.
Carazzone, J. et al. (2005) *SEG Expanded Abstract* 24, p. 575.
Commer and Newman (2008) "New Advances in Three-Dimensional Controlled-Source Electromagnetic Inversion", *Geophysical Journal International* 172, pp. 513-535.
Constable et al. (1987) "Occam's Inversion: a Practical Algorithm for Generating Smooth Models from EM Sounding Data," *Geophysics*, 52, pp. 289-300.
Eidesmo, T. et al. (2002) *First Break*, vol. 20.3, pp. 144-152.
Ellingsrud, S. et al. (2002) *The Leading Edge*, pp. 972-982.
Kaputerko et al (2007) "Sensitivity Analysis of Marine CSEM Surveys," *SEG Annual Meeting*, San Antonio.

(Continued)

*Primary Examiner* — Kamini S Shah
*Assistant Examiner* — Andre Pierre Louis
(74) *Attorney, Agent, or Firm* — ExxonMobile Upstream Research Company Law Dept.

(57) ABSTRACT

A method for suppressing measurement system signature, or artifacts, that arise when controlled source electromagnetic survey data are inverted to obtain a resistivity image of a subsurface region. The method involves identifying regions (47) where the image has low or rapidly varying sensitivity to data acquired by a given receiver, typically regions close to and under the given receiver. Then, in the iterative inversion process where a resistivity model is updated to minimize an objective function, the model update is modified (48) to reduce the impact of such low sensitivity regions on the update.

18 Claims, 3 Drawing Sheets
(3 of 3 Drawing Sheet(s) Filed in Color)

OTHER PUBLICATIONS

Lu and Alumbaugh (2001) "Three-Dimensional Sensitivity Analysis of Induction Logging in Anisotropic Media," *Petrophysics 42*, pp. 566-579.

Menke, W. (1989) *Geophysical Data Analysis: Discrete Inverse Theory*.

Newman and Alumbaugh (1997) "Three-Dimensional Massively Parallel Electromagnetic Inversion I: Theory," *Geophys. J. Int.* 128, pp. 345-354.

Parker (1975) "The Theory of Ideal Bodies for Gravity Interpretation," *Geophy. J. R. astr. Soc.*, 42, pp. 315-334.

Pratt (1999) "Seismic Waveform Inversion in the Frequency Domain, Part 1: Theory and Verification in a Physical Scale Model", *Geophysics* 64, pp. 888-901.

Smith and Booker (1988) "Magnetotelluric Inversion for Minimum Structure," *Geophysics*, 53, pp. 1565-1576.

Spies and Habashy (1995) "Sensitivity Analysis of Crosswell Electromagnetics," *Geophysics* 60, pp. 834-845.

Zhdanov and Hursan (2000) "3D Electromagnetic Inversion Based on Quasi-Analytic Approximation," *Inverse Problems* 16, pp. 1297-1322.

US 6,522,146, Feb. 2003, Srnka (withdrawn).

* cited by examiner

INVERSION OF CSEM DATA WITH MEASUREMENT SYSTEM SIGNATURE SUPPRESSION

CROSS-REFERENCE TO RELATED APPLICATION

This application claims the benefit of U.S. Provisional Patent Application 61/083,013 filed 23 Jul. 2008, the entirety of which is incorporated by reference herein.

FIELD OF THE INVENTION

The invention relates generally to the field of geophysical prospecting, and more particularly to controlled source electromagnetic prospecting. Specifically, the invention is a method for inverting electromagnetic data to infer subsurface resistivity structure.

BACKGROUND OF THE INVENTION

Electromagnetic (EM) properties of hydrocarbon-filled and water-filled reservoirs differ significantly. For example, the resistivity difference between the two cases can be up to two orders of magnitude. Electromagnetic methods (EM) exploit these differences to predict the nature of a reservoir and reduce costs in hydrocarbon exploration. Recently, the controlled-source electromagnetic ("CSEM") method is becoming a promising direct-hydrocarbon-indicator ("DHI") tool to de-risk drilling decisions; see for example U.S. Pat. No. 6,522,146 to Srnka.

Inversion (or imaging) is fundamental to analyzing CSEM data for hydrocarbon exploration (Carazzone, et al., *SEG Expanded Abstract* 24, P575 (2005)). Inversion is a procedure for obtaining earth models that are consistent with the measured data. The inversion process thus provides physically meaningful information on both rock properties and earth structure. Inversion methods are typically implemented as an optimization problem in which the mismatch between measured and forward synthesized data is minimized. For CSEM data, forward synthesis or forward modeling uses Maxwell's equations to simulate the earth's response for a given set of model parameters and can be described mathematically by $d=F(m)$, where d is a vector of measured data and m is a model of the earth's resistivity. The operator F thus provides a means to compute d for any given model m. The inverse problem is to find the values m that yield the given data d and may be written symbolically as $m=F^{-1}(d)$. The inverse operator $F^{-1}$ is nonlinear and non-unique for CSEM inversion. In addition to the mismatch between measured and synthetic data, the inverse problem includes a model regularization term intended to dampen non-physical fluctuations in m. A simple and computationally tractable approach to the nonlinear multi-dimensional inverse problem is iterative linearized inversion. The nonlinear relationship between data and model in the forward problem is approximated by $d=F(m_0)+G\delta m$, where the model update, $\delta m$, is assumed to be small. The model update $\delta m$ relative to a previous model $m_0$ is obtained by solving the linear system $G\delta m=b$, where G is the Jacobian matrix and $b=d-F(m_0)$ is the data residual. The model can be updated iteratively by adding $\delta m$ to $m_0$ until a satisfactory fit to the data has been achieved. The inverse problem and its solution have been studied extensively. See, for example, R. L. Parker, *Geophysical Inverse Theory*, (1994); W. Menke, *Geophysical Data Analysis: Discrete Inverse Theory*, (1989); and A. Tarantola, *Inverse Problem Theory*, (1987). These are general background treatises that the skilled practitioner will not need to refer to and which are considered to have no direct bearing on the invention disclosed below.

Inversion of EM data can provide unique information related to reservoir location, shape and fluid properties. However, the model derived from this inversion process is affected not only by the mathematical formulation and implementation of the inverse problem but also by the measurement system and survey design. Sometimes such "artifacts" can appear in inversion results. For example, Zhdanov and Hursan observe that the Born inversion gives a large number of unwanted artifacts while the focusing inversion algorithm obtains much more realistic models ("3D electromagnetic inversion based on quasi-analytic approximation," *Inverse Problems* 16, 1297-1322 (2000)). In cross-well EM inversion, Alumbaugh observes that artifacts appear near the bottom of the receiver well. He attributes it to the geology not obeying the cylindrical assumptions employed in his inversion scheme ("Linearized and nonlinear parameter variance estimation for two-dimensional electromagnetic induction inversion," *Inverse Problem* 16, 1323-1341 (2000)). In the same paper, Alumbaugh also notices that immediately adjacent to the transmitter well the error estimates are greater than near the center of the borehole region and/or near the receiver well when he is doing error estimation on inversion results. However, one would expect this region to have lower uncertainty estimates as the sensitivity of the data to the model for the cross-well configuration is greatest in the regions near the sources and receivers. He determines this seemingly erroneous behavior is caused by the fact he is coupling the cylindrical geometry with the minimization of the first-derivative constraint. To eliminate this artifact in error estimate, he proposes a method to constrain the model in cells immediately adjacent to the transmitter borehole to known conductivities derived from the well logs by employing very tight bounds. Commer and Newman ("New advances in three-dimensional controlled-source electromagnetic inversion", *Geophysical Journal International* 172, 513-535 (2008)) experience artifacts due to statics and positioning errors at the detectors. They call those near-surface image artifacts "source signature." By following Pratt for seismic waveform inversion, they assign an unknown complex scaling factor to each CSEM source to take into account data distortions in the form of both amplitude and phase shifts. (Pratt, "Seismic waveform inversion in the frequency domain, Part 1: Theory and verification in a physical scale model", *Geophysics* 64, 888-901 (1999).

It is well known that the final recovered earth model from the inversion process is not unique. In other words, many models can provide an acceptable fit to the measured data, since the data are finite in number and of limited accuracy. Mathematical approaches such as regularization are often implemented in inversion algorithms to mitigate some aspects of the non-uniqueness problem. A popular approach involves including model regularization terms in the objective function to be minimized, particularly regularization terms that penalize roughness of the model (Tikhonov and Arsenin, *Solutions of ill-posed problems*, F. John, Translation Editor, V. H. Winston and Sons (distributed by Wiley, New York), (1977); Parker, "The theory of ideal bodies for gravity interpretation," *Geophy. J. R. astr. Soc.* 42, 315-334 (1975); Constable et al., "Occam's inversion: a practical algorithm for generating smooth models from EM sounding data," *Geophysics* 52, 289-300 (1987); Smith and Booker, "Magnetotelluric inversion for minimum structure," *Geophysics* 53, 1565-1576 (1988)). The Tikhonov and Arsenin book is of historical interest because it was the first use of regularization in inversion. Regularization may be useful for mitigating artifacts below the receivers, but it is not designed specifically to suppress the acquisition signature in CSEM inversion results. In fact, the inversion algorithm used to generate the results in FIG. 1 includes a regularization term designed to produce a smooth model; it has clearly not eliminated the artifacts.

The use of strict bounds for cells near borehole may be feasible for cross-well imaging since resistivity logs are available, but not feasible for all cells near receivers in marine CSEM case because resistivities of shallow subsurface over a survey area are normally not known. The so-called "source signature" experienced by Commer and Newman is due to near-surface statics and positioning error, in contrast to the acquisition system signature addressed by the present invention which is intrinsic.

The inventors know of no methods that have been developed specifically for suppressing the acquisition system overprint in CSEM inversion. Such a method is needed, and the present invention fulfills this need to suppress artifacts associated with the acquisition system, thereby making it possible to generate more reliable and geologically consistent resistivity images.

SUMMARY OF THE INVENTION

In one embodiment, the invention is a method for transforming controlled source electromagnetic ("CSEM") survey data acquired from a subsurface region to a resistivity model of the subsurface region indicating hydrocarbon presence or absence, comprising:

(a) constructing an initial discrete resistivity model of the subsurface region and determining one or more regions in the model, associated with source or receiver locations, wherein electromagnetic data have relatively low or fluctuating sensitivity to resistivity changes in such one or more regions ("anomalous sensitivity regions");

(b) performing inversion of the survey data to generate an update to the initial resistivity model;

(c) modifying the model update to selectively mitigate sensitivity effects in the anomalous sensitivity region or regions of the model without affecting other regions of the model; and (d) applying the modified update to transform the initial model to an updated model having suppressed measurement system artifacts;

(e) using the updated resistivity model to predict whether the subsurface region contains an accumulation of hydrocarbons.

BRIEF DESCRIPTION OF THE DRAWINGS

The patent or application file contains at least one drawing executed in color. Copies of this patent or patent application publication with color drawings will be provided by the Office upon request and payment of the necessary fee.

The present invention and its advantages will be better understood by referring to the following detailed description and the attached drawings in which.

The invention will be described in connection with its preferred embodiments. However, to the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Figure 1:
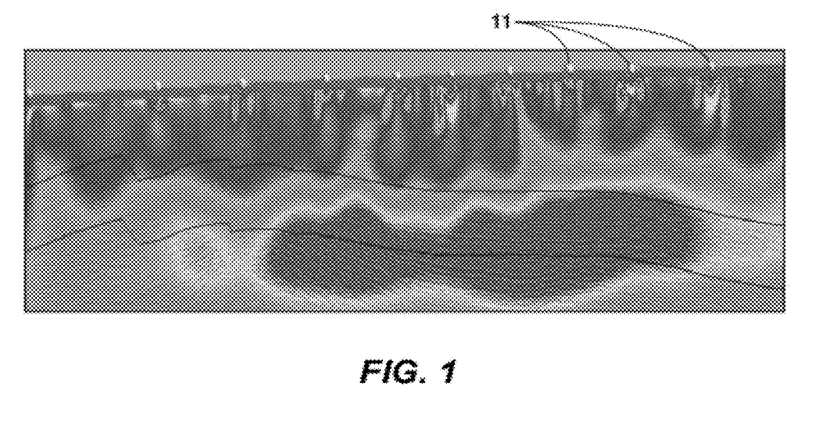
FIG. 1 is a computer data display showing an inverted resistivity model from a field data set, in which artifacts appear as localized, nearly vertical stripes associated with receiver locations (the grey spheres near the seafloor)

FIG. 1 shows a resistivity model inverted from a CSEM data set. Many localized, nearly vertical features appear in the upper one-third of the image. Upon close examination, these structures are seen to be associated with receiver locations 11 and some of the structures are much more conductive than the surrounding medium. These features are not consistent with the overall geologic stratifications and are artifacts. Since the data depend upon resistivity values throughout the image, these shallow artifacts influence (through the inversion process) the deeper resistivity structure and therefore affect the overall interpretation. Generating CSEM inversion results of the quality of FIG. 1 requires somewhat advanced techniques due to the complexity and computer resource requirements of inversion of a large 3D field data set. There is currently a lack of commercial software products suitable for this particular type of inversion problem. Research-oriented software tends to be strongly taxed by inversion of 3D field data. The core code used to generate the inversion results in FIG. 1 was licensed from Sandia National Lab., now Lawrence Berkeley National Lab., which code is based on Newman and Alumbaugh, "Three-dimensional massively parallel electromagnetic inversion I: Theory," *Geophys. J. Int.* 128, 345-354 (1997). Extensive modifications were made to the core code by personnel at ExxonMobil Upstream Research Company. See Carazzone et al., *SEG Expanded Abstract* 24, P575 (2005). FIG. 1 was very helpful in providing an excellent portrayal of the technical problem addressed herein, particularly the clear connection of the artifacts to receiver locations. However, application of the present inventive method and realization of the advantages of it are not limited to state of the art inversion programs.

Figure 2:
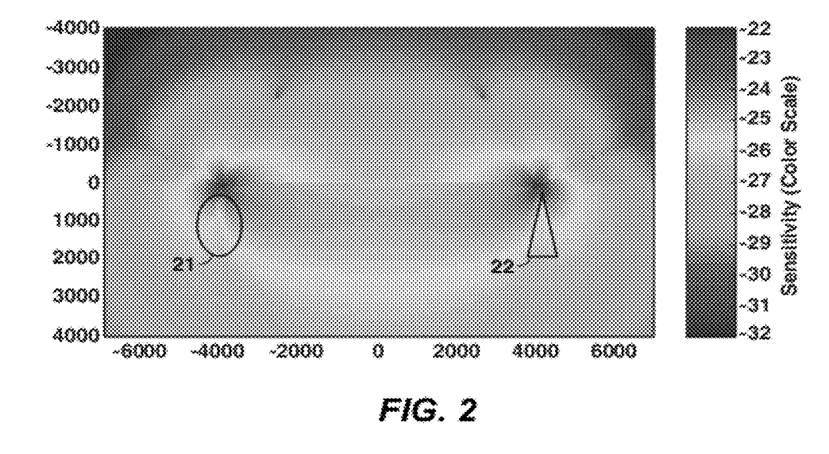
FIG. 2 is a sensitivity cross-section of the inline horizontal field component, Ex, from a collinear electric dipole source, where the source is located at x=−4000 m. and the receiver at +4000 m.

Sensitivity analysis quantifies how a small change in the earth affects the receiver measurements. In CSEM analyses and herein, sensitivity is defined as the ratio of the change in electric (or magnetic) field strength to a change in conductivity of a portion of the model. Sensitivity therefore characterizes the ability of the CSEM survey to detect or resolve specific geological features. FIG. 2 shows a sensitivity cross-section of the inline electric field to the horizontal electric source excitation for a two-half-space model consisting of seawater (0.3 Ω-m) and earth (1.0 Ω-m). FIG. 2 was generated using a code licensed from the University of Wisconsin and developed by Xinyou Lu. Details can be found in Lu and Alumbaugh, "Three-Dimensional Sensitivity Analysis of Induction Logging in Anisotropic Media," *Petrophysics* 42, 566-579 (2001). As with FIG. 1, generating an output such as FIG. 2 is not routine, but persons who work in the technical field know how to do it. For example, Spies and Habashy published figures showing sensitivity for crosswell EM data ("Sensitivity analysis of crosswell electromagnetics," *Geophysics* 60, 834-845 (1995)). Also, Kaputerko et al did some sensitivity analysis for marine CSEM surveys. Because they used integrated sensitivity, their results cannot reveal the rapid changes in the area beneath receivers. ("Sensitivity analysis of marine CSEM surveys," 2007 *SEG Annual Meeting*, San Antonio)). FIG. 2 was generated in trying to understand why FIG. 1 has vertical stripes (artifacts). Considering FIGS. 1 and 2 together led ultimately to the present invention.

It can be seen from FIG. 2 that the data from the current measurement system are sensitive to conductivity mainly in the region between the transmitter (x=−4,000 m) and receiver (x=4,000 m). The sensitive region is in the shape of a sausage bent slightly downwards. A second important feature of the sensitivity is that the sensitivity patterns close to the receiver and transmitter are very complex. The sensitivity varies rapidly with space in the region around each receiver or transmitter (oval 21 in FIG. 2). In particular, regions of low sensitivity (or null zones) (triangle 22 in FIG. 2) appear directly below the receiver and transmitter. In other words, the data are not sensitive to resistivity changes in the null zones. Because of this feature (the presence of a complex sensitivity pattern and null zones), the inverted image is prone to have artifacts in the regions close to and beneath receiver locations (the gray spheres 11 near the seafloor) and transmitter locations, as the example of FIG. 1 shows. Since the transmitter is moving during data acquisition (being towed perhaps 50 m above the seafloor) and it usually samples much finer than the receiver (normally less than 100 m for the transmitter versus over 1000 m for the receiver, the anomalous sensitivity feature associated with the transmitter will be smeared out and will have less deleterious impact on the image, i.e. the motion of the source along the tow line produces an averaging effect. However, the artifacts associated with the stationary receivers will remain in the final model, and will induce errors in the deeper portions of the model.

The artifacts associated with the receivers will be even more severe when errors are present in either the initial model for the inversion, particularly in the region near the receiver, or in the measured CSEM data, for example due to an error in receiver orientation. Such artifacts can slow the convergence of the inversion and cause it to stall prematurely, thus compromising the inversion result. Reducing the size and magnitude of these artifacts can improve the convergence rate of the inversion and help generate a more reliable resistivity image of the subsurface.

Figure 3:
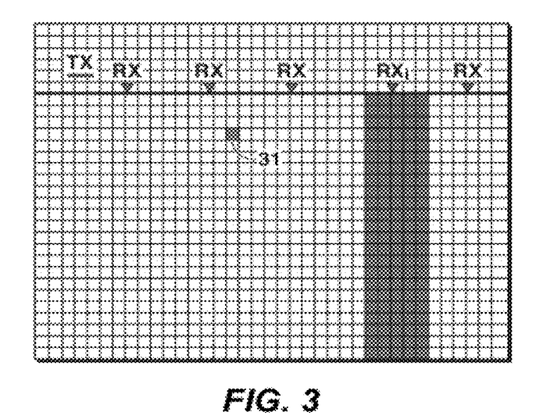
FIG. 3 is a discretized resistivity model indicating a region of low sensitivity beneath receiver $RX_i$.

This invention discloses an inversion method designed to suppress inversion artifacts induced by the arrangement of the measurement system. Such artifacts may be called signatures of the measurement system. FIG. 3 shows a typical geometry with one transmitter TX and multiple receivers RX in 2D. It is known from FIG. 2 that the sensitivity of the image to data acquired by receiver $RX_i$ varies rapidly from very large to very small values in the shaded region beneath it. This region is therefore prone to contamination by artifacts. This invention is designed to minimize or eliminate artifacts in regions below the receiver locations, based on computed values of the sensitivity. A key element in some but not all embodiments of the present invention is that the region beneath any particular receiver is primarily updated based on the data associated with other receivers, thereby mitigating artifacts associated with the low-sensitivity zone beneath the particular receiver.

Figure 4:
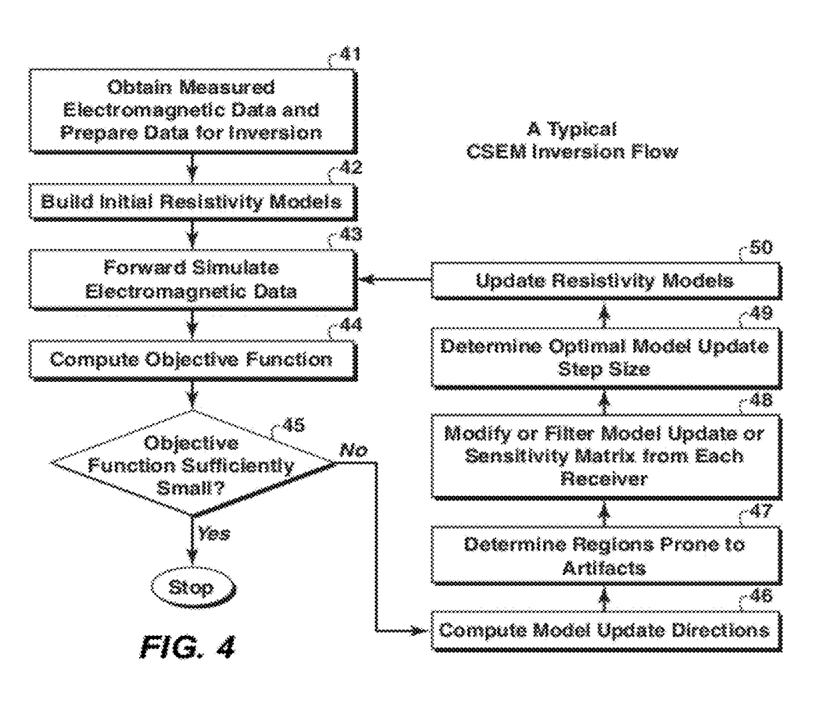
FIG. 4 is a flow chart showing the present invention as extra steps added to a typical iterative inversion process for CSEM data.

FIG. 4 is a flow chart of basic steps in one embodiment of the invention, including two additional steps (47 and 48) designed to mitigate the measurement system signature artifacts.

In step 41, the data are prepared for inversion. Because of the well known skin-depth effect, electromagnetic signals decay exponentially with distance from the source (and transmitter). The receiver cannot record high-quality signals when it is located far from the source, because at some distance the desired signal decays to the level of the ambient noise. When the source is too close to the receiver, the receiver is saturated because its electronics have a limited dynamic measurement range. In this situation the measured signals are distorted. It is preferred for the invention (and for CSEM data processing in general) that data for input to the inversion process are selected from intermediate source-receiver offsets such that the source generates signals strong enough to produce a good signal-to-noise ratio (S/N), but not strong enough to saturate the receiver. In addition, accurate source and receiver geometry measurements are required for the selected data. The term "geometry" includes orientations and coordinates of both the receiver and transmitter.

In step 42, a discrete resistivity model of the subsurface is developed. Discretization of the model is used to reduce a continuous model to an equivalent discrete model that is suitable for a numerical solution. Instead of developing a continuous solution defined everywhere in the model, approximations are obtained at the isolated cell and node locations derived by the discretization algorithm. Discrete approximations to the model can be used as the basis for various numerical methods, notably finite-difference methods, finite-element methods, boundary-element methods, and integral-equation methods. Proper discretization is required in order to obtain sufficiently fast, accurate, and stable solutions. For CSEM, the required discretization (expressed in skin depths) is different for each of the numerical methods mentioned above, even when these are applied to the same problem. As a general rule, the grid spacing is required to be fine enough such that at least three or more nodes are present within one skin depth. At locations close to the transmitter, a finer mesh may be required in order to account for the geometric singularity created by the transmitter and the greater field curvature present in the neighborhood of the transmitter. If the problem to be solved requires solutions for a relatively wide range of frequencies, computational efficiency may be improved by varying the spacing of the discrete mesh with frequency, using a coarser grid at lower frequencies. The discretization scheme discussed in this paragraph refers to that required for the forward modeling steps (43) of the inversion algorithm.

In step 43, electromagnetic data are forward simulated using the initial resistivity models from step 42.

In step 44, the objective function defined for the inversion is calculated. The objective function normally includes both data misfit between the measured and calculated data and a model constraint part.

In step 45, the value of the objective function is compared to a pre-set value. The inversion process is finished if the value of the objective function is smaller than the pre-set value. Otherwise, the inversion process continues to step 46.

In step 46, the model update directions are calculated for predicting the resistivity models for the next iteration. An adjoint solution method is usually but not necessarily used for predicting model update directions in three-dimensional space.

In step 47, the regions prone to artifacts are determined for the data set of each receiver. As described above, the region of the inverted model most prone to artifacts is associated with each receiver location. These regions can be determined by a number of methods (pre-set, empirically, according to inversion results from the previous iteration, etc), but preferably from a determination of the sensitivity associated with each receiver (such as is illustrated in FIG. 2).

When the region prone to artifacts for a particular receiver, $RX_j$, is determined, the next step (step 48) is to minimize the influence of the electromagnetic data measured by receiver $RX_j$ on the model updates in this region. In different embodiments of the invention, this can be done by (i) iteratively updating the model one artifact-prone region at a time, using data from other receivers, i.e. excluding the receiver in the region; (ii) modifying a sensitivity matrix; or (iii) filtering the model update. All of these three embodiments of the present inventive method involve modifying the model update computed in iterative data inversion, where the modifications are made selectively, i.e., affecting only identified low sensitivity regions and not other regions. In contrast, traditional regularization (which can advantageously be used in conjunction with the present inventive method because the primary objective of each is different) can affect the model update, but does not do so in a way that is specifically designed to address measurement system artifacts, and does not do so selectively. In fact, regularization was used in generating FIG. 1, and clearly did not prevent artifacts.

One relatively simple embodiment of the invention involves modifying the elements of a sensitivity matrix, G, or the elements of the model update vector, associated with each receiver in the artifact-prone region beneath it as determined above, to reduce its impact in this region. That is, constraints are applied either to the sensitivity matrix G, or directly to the computed resistivity updates, such that artifacts are not allowed to form in the regions determined to be prone to artifacts.

In detail, the data sensitivity matrix G can be written as $$G = \begin{vmatrix} \frac{\partial d}{\partial m_1} & \frac{\partial d_1}{\partial m_2} & \cdots & & \frac{\partial d_1}{\partial m_M} \\ \frac{\partial d_2}{\partial m_1} & \frac{\partial d_2}{\partial m_2} & \cdots & & \frac{\partial d_2}{\partial m_M} \\ \vdots & \vdots & & & \vdots \\ \frac{\partial d_i}{\partial m_1} & \frac{\partial d_i}{\partial m_2} & \cdots & \frac{\partial d_i}{m_j} & \cdots & \frac{\partial d_i}{\partial m_M} \\ \vdots & \vdots & & & \vdots \\ \frac{\partial d_N}{\partial m_1} & \frac{\partial d_N}{\partial m_2} & \cdots & & \frac{\partial d_N}{\partial m_M} \end{vmatrix}$$

where $$\frac{\partial d_i}{\partial m_j}$$

is the sensitivity of the $i^{th}$ datum to a change in the resistivity model at the $j^{th}$ cell (e.g. cell 31 in FIG. 3). For receiver $$RX_k, \frac{\partial d_i}{\partial m_j}$$

will either be very small or will exhibit rapid spatial fluctuations for data points $d_i$ associated with receiver $RX_k$ and model cells $m_j$ located in the shaded region of FIG. 3. The sensitivity matrix for each of the other receivers will behave similarly in the region beneath the corresponding receiver.

Since the objective has been formulated herein that the area of low/rapidly-fluctuating sensitivity should not affect the inversion for each receiver, the present inventive method modifies the sensitivity matrix G such that those areas do not contribute (or make a reduced contribution) to the solution. One way to do this is to add a damping matrix to G, whose values are large for model cells located in the shaded region in FIG. 3. This has the effect of reducing the value of the elements of the inverse sensitivity matrix $G^{-1}$ that will produce model updates in the blue region by converting misfit between simulated and actual data ($\Delta d$) to an increment ($\Delta m$) to the resistivity model.

The invention embodiment described above, i.e. when the components of the sensitivity matrix G can be computed explicitly, is the preferred embodiment of this invention. Examples will be given below of several example embodiments of the invention, some requiring an explicit G matrix (items 2-5), but also others in which it is not practical to compute the sensitivity matrix explicitly, particularly for 3D problems. The concept of the invention, that is that model artifacts produced in areas of low or rapidly varying sensitivity may be ameliorated by a damping procedure, may still be applied by appealing to approximation techniques.

Such alternative embodiments include:

1. Updating the artifact-prone region beneath any particular receiver by inverting the data associated with other receivers.
2. The modified section of the sensitivity matrix may be extended to include regions of unusually high sensitivity close to the receiver, thereby reducing the impact of data from the receiver and favoring data from other receivers whose sensitivities vary more smoothly in the region near the given receiver.
3. The sensitivities may be weighted, thereby preserving the effect of data associated with that receiver, but preventing it from overwhelming the effect from another receiver's data.
4. The weighting schemes may be smoothly transitioned to a region of no weighting as the horizontal distance from the receiver increases. This avoids the introduction of new artifacts associated with the presence of a sharp boundary between the suppressed and unsuppressed regions.
5. The weighting scheme may be implemented as a spatial filter designed to dampen anomalously high or low values of the sensitivity. This filter may furthermore be designed based on its characteristics in the spatial Fourier domain, and implemented in that domain.
6. The spatial filter may be implemented as a general filter based on the statistics of the sensitivity matrix elements or the resistivity model update vector. The filter can depend both on spatial location and on the value of the sensitivity matrix element or resistivity model update at that location. This filter will reduce anomalously high values in the model update or increase anomalously low values in the sensitivity matrix elements, either throughout the model or in regions prone to contain artifacts. This technique can be applied with or without an explicit G matrix.

7. The filter may be preferably applied to the sensitivity matrix or model update from each receiver individually before forming the total sensitivity matrix or aggregate model update from all receivers. This technique can be applied with or without an explicit G matrix.

8. The invention may be carried out in an adjoint formulation, where the sensitivity matrix is not formed explicitly. An adjoint solution forms updates to the resistivity model, and these updates may be zeroed, filtered, or otherwise down-weighted based on their position relative to the receiver (and their values in the case of filtering) without regard to the sensitivities themselves. This embodiment is particularly important, as it can be implemented in an algorithm using an adjoint formulation on a massively parallel computer, such computers being generally required to solve large, 3D problems; and, 9. The nature of the weighting, or filtering process can be based on approximate sensitivities calculated from an essentially 1D (layercake) earth model, or from an approximate method for a 2D or 3D earth model. This technique can be applied with or without an explicit G matrix.

In step 49 of FIG. 4, the step size for the model update along the update direction is chosen to minimize the objective function. This can be achieved by a method such as a line search or other technique. It should be noted that the numerical order of the method steps do not necessarily mandate order or sequence of performance; for example, step 49 may be performed before step 47. However, that may affect convergence rate, and the sequence of FIG. 4 is generally found to be preferred. Choosing an optimal model update step size which minimizes the objective function after modifying the model update directions can speed up the convergence of the inversion.

In step 50, the resistivity models are updated by using the modified model update directions and the determined step size for the next iteration of the inversion process. At each iteration for model update in the inversion, the model update is modified or filtered (step 48) before updating the model for the next iteration. This modification or filter is designed as described above to reduce the artifacts caused by the measurement system.

EXAMPLES

Figure 5:
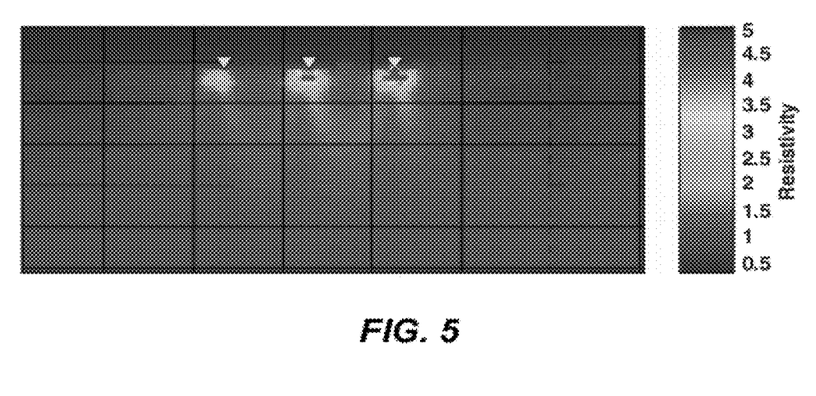
FIG. 5 is a computer data display showing a vertical slice of resistivity from an inversion of CSEM data performed by traditional means that do not include any technique designed specifically to suppress measurement system artifacts in the inversion process.
Figure 6:
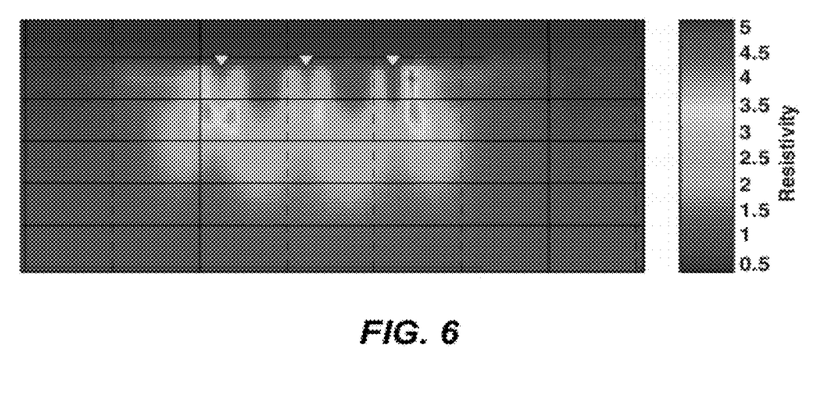
FIG. 6 illustrates the difference that the present inventive method made to FIG. 5 when incorporated into the inversion process.

A synthetic CSEM data set is used to illustrate the effectiveness of the present invention. FIG. 5 shows a vertical slice of resistivity from an inversion carried out without a spatial filter. The large resistivity updates are localized below each receiver (inverted triangles); this effect is related to the weak sensitivity in those regions. FIG. 6 shows a vertical slice of resistivity from an inversion using a spatial filter to reduce the model update within a predefined region around each of the receivers. In this example, the filter applied to the resistivity update from a certain receiver is $f(r)=(1-\cos(\pi r/r_0)$ for $r<r_0$, and $f(r)=1$ for $r>r_0$, where r is the radial distance from the receiver. The value of $r_0$ used in this example is 500 m. The filter was applied to the model update from each receiver before forming the total model update for the next iteration.

The value of $r_0$ can be chosen to depend upon frequency and upon the background resistivity (near the receiver location). A value of one-half of the skin depth may be a reasonable value for practical applications. Comparing FIG. 6 to FIG. 5, it is clear that the application of this filter has reduced the artifacts around each of the receivers and generated stronger resistivity updates in the deeper part of the model, which are closer to the actual resistivity.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, at least some of the steps in the present inventive method are performed on a computer, i.e. the invention is computer implemented. In such cases, the resulting inversion-updated resistivity model, with measurement system artifacts suppressed, may either be downloaded or saved to computer storage.

The invention claimed is:

1. A method for transforming controlled source electromagnetic ("CSEM") survey data acquired from a subsurface region to a resistivity model of the subsurface region indicating hydrocarbon presence or absence, comprising:
   (a) constructing an initial discrete resistivity model of the subsurface region and determining one or more regions in said initial discrete resistivity model, below source or receiver locations, wherein electromagnetic data have relatively low or fluctuating sensitivity to resistivity changes in such one or more regions, called anomalous sensitivity regions;
   (b) performing inversion of the survey data to generate an update to the initial resistivity model;
   (c) modifying the model update to selectively mitigate sensitivity effects in the anomalous sensitivity region or regions of the model without affecting other regions of the model, wherein said selectively mitigate sensitivity effects is designed to reduce influence on the anomalous sensitivity region or regions of the model due to survey data associated with the nearest receiver or source; and
   (d) applying the modified update to transform the initial model to an updated model having suppressed measurement system artifacts;
   (e) using the updated resistivity model to predict whether the subsurface region contains an accumulation of hydrocarbons.

2. The method of claim 1, further comprising performing iterative inversion of the survey data using the updated model from the last iteration as the initial model for the next iteration.

3. The method of claim 2, wherein performing inversion comprises:
   forward modeling to generate computer-simulated survey data using the initial model;
   comparing the simulated data to actual survey data; and
   determining a model update to reduce misfit between simulated and actual data.

4. The method of claim 3, wherein the model update is determined by minimizing an objective function.

5. The method of claim 3, wherein iteration is stopped when misfit between simulated and actual data meets a predetermined criterion, or another stopping condition is met.

6. The method of claim 1, wherein modifying the model update to mitigate sensitivity effects comprises computing the components of a data sensitivity matrix G showing sensitivity of an ith data element to a change in the resistivity model at a jth model cell, then modifying elements of G associated with anomalous sensitivity regions, then generating the model update using the inverse matrix G-1, wherein the modifications in G are selected to reduce the contribution of the modified matrix elements to the model update.

7. The method of claim 6, wherein matrix element $G_{ij}=\partial d_i/\partial m_j$, where $d_i$ is an ith electromagnetic data value and $m_j$ is the model's resistivity value at a jth model cell.

8. The method of claim 6, wherein the sensitivity matrix G is modified by adding a damping matrix to it, said damping matrix having relatively large values for model cells in anomalous sensitivity regions.

9. The method of claim 1, wherein said sensitivity effects are geologically inconsistent resistivity values in the anomalous sensitivity region or regions of the model.

10. The method of claim 9, wherein geologically inconsistent resistivity values means resistivity values less than surrounding regions by a pre-determined amount, or resistivity values having spatial variability that is greater than surrounding regions by a pre-determined amount.

11. The method of claim 1, wherein modifying the model update to mitigate sensitivity effects in the anomalous sensitivity region or regions of the model is performed by applying a spatial filter to the model update.

12. The method of claim 11, wherein the spatial filter is designed based on its characteristics in a spatial Fourier transform domain.

13. The method of claim 6, wherein a spatial filter is applied to the sensitivity matrix.

14. The method of claim 3, wherein modifying the model update to mitigate sensitivity effects comprises eliminating data recorded by a receiver nearest to an anomalous sensitivity region from the actual data that are compared to the simulated data in the anomalous sensitivity region.

15. The method of claim 1, wherein anomalous sensitivity regions are determined by determining sensitivity associated with each receiver, and examining sensitivity plots for regions of low or fluctuating sensitivity.

16. The method of claim 1, wherein the initial discrete resistivity model is subdivided into discrete cells, and modifying the model update is cell dependent.

17. The method of claim 1, wherein relatively low or fluctuating sensitivity is determined using predetermined numerical criteria to define low and fluctuating relative to surrounding regions in the model.

18. A method of producing hydrocarbons from a subsurface region, comprising:
 (a) obtaining results of a controlled-source electromagnetic survey conducted over the subsurface region;
 (b) obtaining from the survey results a prediction of hydrocarbons presence made from an inverted resistivity model that was updated so as to selectively mitigate sensitivity effects in anomalous sensitivity region or regions of the resistivity model without affecting other regions of the resistivity model, said selectively mitigate sensitivity effects being designed to reduce influence on the anomalous sensitivity region or regions of the resistivity model due to survey data associated with a nearest receiver or source; and
 (c) drilling a well into the subsurface region based at least in part on the hydrocarbons prediction, and producing hydrocarbons from the well.

* * * * *